United States Patent Office 3,353,001
Patented Nov. 14, 1967

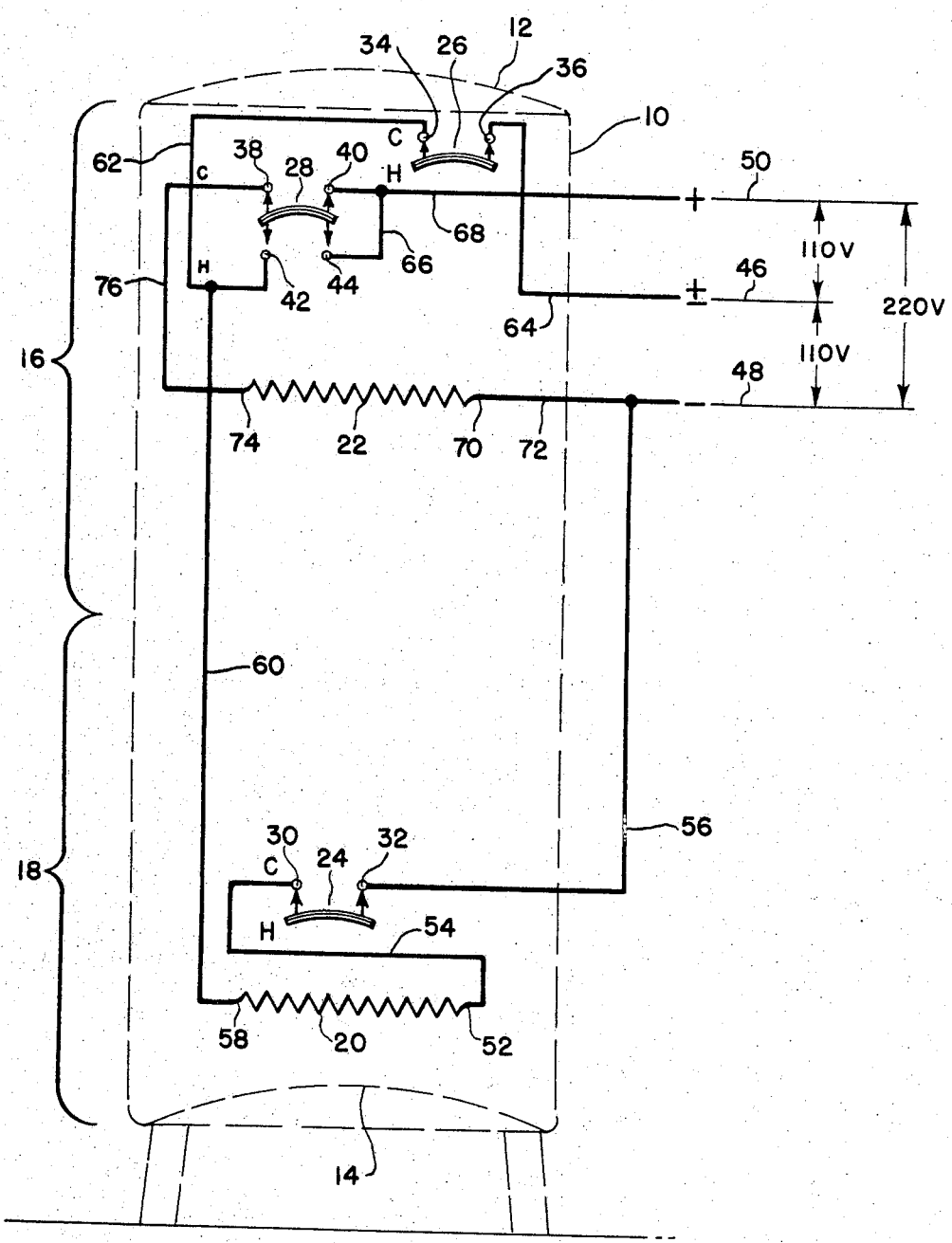

3,353,001
ELECTRIC WATER HEATER CIRCUIT
Edward L. Macoicz, Shorewood, and Allyn H. Fitzpatrick, Greendale, Wis., assignors to General Electric Company, a corporation of New York
Filed Apr. 28, 1965, Ser. No. 451,490
5 Claims. (Cl. 219—321)

ABSTRACT OF THE DISCLOSURE

Electric heater circuit means for a water tank having a lower water inlet portion and an upper water outlet portion. The circuit means include first and second electrical resistance heating elements located in the tank lower and upper portions, respectively, and three thermostatic switching devices, two responsive to water temperature in the tank upper portion and one responsive to water temperature in the tank lower portion. The heating elements are energized through the switching devices from a three-wire single-phase power supply system. The arrangement of the circuit means is such that either or both of the heating elements can be energized and that one can be energized at two different power levels by applying different voltages to it.

---

This invention relates to an electric water heater circuit. More specifically, it relates to an electric water heater circuit which provides improved recovery as well as automatic flexibility of recovery.

It is an object of this invention to provide an electric water heater having rapid recovery, but without an excessive current demand on the power system.

It is an object of this invention to provide an electric water heater having automatic flexibility of recovery.

It is another object of this invention to provide an electric water heater, having both rapid recovery and flexibility of recovery, which is economical to produce through the use of existing standard circuit components, or new components which can be economically provided.

These objects are accomplished in accordance with this invention, in one form thereof, by providing a water heater tank with two electrical heating elements and with three thermostatic switching devices. The electrical heating elements are energized through the switching devices from a three-wire single-phase power system. The switching devices are positioned so as to be sensitive to the tank temperatures in its upper and lower portions. The circuit arrangement is such that either or both of the heating elements can be energized and that one of the heating elements can be energized at two different levels by applying different voltages to it.

Other objects and further details of that which is believed to be novel in the invention will be clear from the following description and claims taken with the accompanying drawing wherein:

The figure of the drawing is a circuit diagram of the arrangement of this invention for energizing heating elements of an electric water heater, and shows the physical location of the circuit components with respect to the water tank.

A cylindrical water heater tank 10 which has a domed top 12 and a concave bottom 14 is divided into two portions, an upper portion 16 and a lower portion 18, to aid in describing the location of the circuit components. For proper operation of the improved circuit arrangement of this invention, it is necessary to locate the electrical circuit elements in a particular portion of the tank 10. A first electrical heating element 20 is located in the lower portion 18 of the tank. A second electrical heating element 22 is located in the upper portion 16 of the tank. The heating elements, which are typically sheathed waterproof electrical resistance heating elements, are placed within the tank 10 with their electrical connections extending through sealed apertures in the tank wall. Three thermally responsive switches 24, 26 and 28 are provided. Thermally responsive switch 24 has a pair of normally closed contacts 30 and 32, and is responsive to the temperature of the lower portion 18 of the tank. Thermally responsive switches 26 and 28 are responsive to the temperature in the upper portion 16 of the tank. Thermally responsive switch 26 is provided with a pair of normally closed contacts 34 and 36. Thermally responsive switch 28 is of a double-throw type provided with a pair of normally closed contacts 38 and 40 and a pair of normally open contacts 42 and 44. One convenient location for the thermally responsive switches is on the outer wall of the tank, in a heat transfer relationship with respect to the wall so as to be responsive to the temperature of the water within the tank.

The electrical heating elements 20 and 22 are energized through the three thermally responsive switches 24, 26 and 28 from a three-wire single-phase power system. The power lines are conveniently identified as a neutral line 46 and outer lines 48 and 50. Instantaneous polarities of these lines are shown in the figure. The line voltages provided by this three-wire system, 110 volts between the neutral line 46 and the outer lines 48 and 50, and 220 volts between the two outer lines, are shown in the upper right-hand portion of the figure.

A first terminal 52 of heating element 20 is connected to outer line 48 in series with the normally closed contacts 30 and 32 of switch 24 and a pair of conductors 54 and 56. A second terminal 58 of heating element 20 may be connected to either neutral line 46 or second outer line 50. It is connected to the neutral line 46 by the normally closed contacts 34 and 36 of switch 26 and conductors 60, 62 and 64. It is connected to the second outer line 50 by the normally open contacts 42 and 44 of switch 28, the conductor 60, and conductors 66 and 68.

A first terminal 70 of heating element 22 is connected to outer line 48 by a conductor 72. A second terminal 74 of heating element 22 is connected to outer line 50 by the normally closed contacts 38 and 40 of switch 28 and the conductor 68, and a conductor 76.

The operation of the circuit arrangement of this invention will now be described assuming that the tank 10 has been filled with cold water. Under such a condition, the thermally responsive switches 24, 26 and 28 will move to the positions indicated by the letters C in the figure. The letters C indicate the normal or cold positions of the thermally responsive switches. The letters H indicate the actuated or hot positions of the thermally responsive switches. That is, the normally closed contacts 30 and 32 of switch 24, 34 and 36 of switch 26, and 38 and 40 of switch 28 will be closed, and the normally open contacts 42 and 44 of switch 28 will be open. With the switches in their normal positions, heating element 20 is connected across neutral line 46 and outer line 48, through the normally closed contacts 34 and 36 of switch 26 and 30 and 32 of switch 24, and is therefore energized by 110 volts. The second electrical heating element 22 is connected across the two outer lines 48 and 50, through the normally closed contacts 38 and 40 of switch 28, and it is therefore energized by 220 volts. The heating of cold water within the tank 10 by the heating elements 20 and 22 will result in heated water rising in the tank, displacing the cold water in the lower portion 18 of the tank. The thermally responsive switches 24 and 26 are adjusted to move from their normal or cold positions indicated by the letters C, to their actuated or hot positions indicated by the letters H, at approximately the same predetermined temperature. The thermally responsive switch 28 is adjusted to move from its normal or cold position, indicated by the letter C, to its actuated or hot position, indicated by the letter H, at a second predetermined temperature, which is several degrees higher than the first predetermined temperature. Since the natural convection of the water carries the warmer water to the upper portion 16 of the tank, and since a greater amount of heat is provided by electrical heating element 22 in the upper portion of the tank, the water in the upper portion 16 reaches the first predetermined temperature before the water in the lower portion 18. When the water in the upper portion 16 of the tank reaches the first predetermined temperature switch 26 moves to the position indicated by the letter H, opening the normally closed contacts 34 and 36, thereby de-energizing heating element 20 located in the lower portion 18 in the tank. Additional heat provided by heating element 22 increases the temperature of the water in the upper portion of the tank until the second predetermined temperature is reached. When this temperature is reached switch 28 moves to its actuated or hot position indicated by the letter H. The normally closed contacts 38 and 40 are open, thereby de-energizing the heating element 22. At the same time, the normally open contacts 42 and 44 are closed, thereby energizing heating element 20 at 220 volts. That is, heating element 20 is connected across the outer lines 48 and 50. Heating element 20 located in lower portion 18 will remain energized until the water in the lower portion 18 of the tank reaches the first predetermined temperature. When this temperature is reached, switch 24 will move from its normal position to its second or hot position indicated by the letter H. The normally closed contacts 30 and 32 of switch 24 are opened, and heating element 20 is de-energized.

During draw-off of hot water from the top of the tank, cold water enters the tank near the bottom 14 (inlet not shown). Therefore during draw-off, switch 24 in the lower portion 18 is the first to return to its normal position as indicated by the letter C. Heating element 20 is re-energized at 220 volts through the normally closed contacts 30 and 32 of switch 24 and the now closed, normally open contacts 42 and 44 of switch 28. Continued draw-off of hot water from the tank at a rate greater than the recovery provided by the energization of heating element 20 at 220 volts will cause the temperature in the upper portion 16 of the tank to drop below the second predetermined temperature. This drop in temperature will cause switch 28 to move to its normal position as indicated by the letter C. Normally open contacts 42 and 44 will be opened, de-energizing heating element 20, and normally closed contacts 38 and 40 will be closed, thereby energizing the heating element 22. Energization of heating element 22 in the upper portion 16 will provide a more rapid recovery in the upper portion of the tank, from which the hot water is being drawn. But, if the recovery provided by the energization of heating element 22 is not sufficient to keep the temperature of the water in the upper portion 16 above the first predetermined temperature, switch 26 will return to its normal position as indicated by the letter C, closing its normally closed contacts 34 and 36. The closing of normally closed contacts 34 and 36 will re-energize heating element 20 at 110 volts. The heating elements are now energized for the maximum rate of recovery, heating element 20 at 110 volts and heating element 22 at 220 volts.

It may be found desirable to mount thermally responsive switch 26 in a position higher than that of the thermally responsive switch 28, as shown, so that switches actuated at the same temperature can be used. With switches 26 and 28 so positioned, switch 26 will be actuated to its second or hot position before switch 28, thereby insuring that a short circuit is not formed through the normally closed contacts 34 and 36 of switch 26 and the normally open contacts 42 and 44 of switch 28, between neutral line 46 and outer line 50.

Alternatively, thermally responsive switches 26 and 28 can be formed as a single unit, with a single thermally responsive mechanism controlling two pairs of normally closed contacts, and one pair of normally open contacts. Since these contacts would be actuated from their normal to their hot position at the same time, a short circuit through the normally open contacts 42 and 44 and the normally closed contacts 34 and 36 would be prevented.

It has thus been seen that the circuit arrangement of this invention provides two levels of recovery in an electric water heater provided with two electric heating elements. It also provides the higher level of heat in either the upper portion 16 or the lower portion 18 of the tank, at which ever is the most desirable location. The heating elements 20 and 22 which are preferably identical, are in a device built according to this invention rated to each provide 3,000 watts when energized at 220 volts. Therefore, on initial draw-off of hot water with only switch 24 in the position indicated by the letter C, and switches 26 and 28 in the position indicated by the letter H, recovery is provided at the rate of 3,000 watts by heating element 20 located in the lower portion 18 of the tank. With further draw-off at a rate faster than the recovery provided by the 3,000 watts in the lower portion 18 of the tank, switch 28 in the upper portion 16 of the tank will move from its hot to its cold or normal position, thereby de-energizing heating element 20, and energizing heating element 22 at 220 volts. Under this condition heating element 22 will provide 3,000 watts. The 3,000 watts is now provided in the upper portion 16 of the tank, which is the desired location for more rapid recovery of the water temperature within the tank. Further draw-off of hot water from the tank will cause the temperature in the upper portion 16 of the tank to drop below a second predetermined temperature, whereupon switch 26 will move to its normal or cold position to energize heating element 20 at 110 volts. This energization of heating element 20 will cause it to provide one-fourth of its rated power or 750 watts. Therefore, the combined recovery power of the two heating elements is 3,750 watts.

While a particular embodiment of the invention has been shown, other embodiments of the invention will be apparent to those skilled in the art, and it is intended to cover by the appended claims all embodiments falling within the scope thereof.

What is claimed as new and desired to be secured by Letters Patent of the United States is:

1. In an electric water heater, an arrangement for energizing a pair of electrical heating elements from a three-wire single-phase system which includes a neutral line and first and second outer lines, comprising:
   (a) a water tank having a lower water inlet portion and an upper water outlet portion,
   (b) a first electrical heating element disposed within said water tank in said lower portion, said first electrical heating element having first and second terminals,
   (c) a second electrical heating element disposed within said water tank in said upper portion, said second electrical heating element having first and second terminals,
   (d) a first thermally responsive switch connecting said first terminal of said first electrical heating element to the first outer line, said first thermally responsive switch being normally closed; and opening when water in said lower portion of said tank reaches a predetermined temperature,
   (e) a second thermally responsive switch connecting said second terminal of said first electrical heating element to the neutral line, said second thermally responsive switch being normally closed; and opening when water in said upper portion of said tank reaches a second predetermined temperature approximately the same as said first predetermined temperature, (f) means connecting said first terminal of said second electrical heating element to the first outer line, and (g) a third thermally responsive switch being of a double-throw type normally connecting said second terminal of said second electrical heating element to the second outer line; and connecting said second terminal of said first electrical heating element to the second outer line when water in said upper portion of said tank reaches a third predetermined temperature, the third predetermined temperature being at least as high as said second predetermined temperature, whereby said first electrical heating element is provided with two levels of energization for automatic flexibility of recovery of water temperature within said tank.

2. The electric water heater arrangement defined in claim 1, wherein the second predetermined temperature is approximately the same as said third predetermined temperature, and wherein said third thermally responsive switch is responsive to the temperature of the water in the upper portion of the tank but at a position below that at which said second thermally responsive switch is responsive.

3. The invention of claim 1, wherein:

(a) said third predetermined temperature is higher than said second predetermined temperature.

4. In an electric water heater, an arrangement for energizing a pair of electrical heating elements from a three-wire single-phase system which includes a neutral line and first and second outer lines, comprising:

(a) a water tank having a lower water inlet portion and an upper water outlet portion, (b) a first electrical heating element disposed within said tank lower portion, (c) a second electrical heating element disposed within said tank upper portion, (d) first thermally responsive circuit means (i) responsive when water temperatures in both said tank portions are below approximately the same predetermined temperature to connect said first heating element across said neutral line and one of said outer lines, (ii) responsive when water temperature in said tank upper portion reaches said predetermined temperature to disconnect said first heating element from said neutral line, and (iii) responsive when water temperature in said tank lower portion reaches said predetermined temperature to disconnect said first heating element from across said outer lines, and (e) second thermally responsive circuit means (i) responsive when water temperature in said tank upper portion is below said predetermined temperature to connect said second heating element across said outer lines and to disconnect said first heating element from the other of said outer lines, and (ii) responsive when water temperature in said tank upper portion reaches and water temperature in said tank lower portion is below said predetermined temperatures to disconnect said second heating element from across said outer lines and to connect said first heating element across said outer lines, whereby said first electrical heating element is provided with two levels of energization for automatic flexibility of recovery of water temperature within said tank.

5. The invention of claim 4, wherein:

(a) said first circuit means includes first and second thermally responsive switches connected in series with said first heating element between said neutral line and said one outer line, (i) said first switch being normally closed and opening in response to water temperature in said tank lower portion reaching said predetermined temperature, and (ii) said second switch being normally closed and opening in response to water temperature in said tank upper portion reaching said predetermined temperature, and (b) said second circuit means includes a third thermally responsive switch that is responsive to water temperature in said tank upper portion and is of a double-throw type having a first position when water in said tank upper portion is below and a second position when water temperature in said tank upper portion reaches said predetermined temperature, (i) said third switch in said first position connecting said second heating element across said outer lines and disconnecting said first heating element from said other of said outer lines, and (ii) said third switch in said second position disconnecting said second heating element from across said outer lines and connecting said first heating element in series with said first switch to said other of said outer lines.

References Cited

UNITED STATES PATENTS

| | | | |
|---|---|---|---|
| 1,892,557 | 12/1932 | McCormick | 219—321 |
| 3,246,119 | 4/1966 | Kinsella | 219—321 |
| 3,249,740 | 5/1966 | Kinsella | 219—321 |

ANTHONY BARTIS, *Primary Examiner.*